United States Patent [19]
Searby

[11] Patent Number: 5,765,186
[45] Date of Patent: Jun. 9, 1998

[54] DATA STORAGE APPARATUS INCLUDING PARALLEL CONCURRENT DATA TRANSFER

[75] Inventor: Anthony David Searby, Newbury, England

[73] Assignee: Quantel Limited, Newbury, England

[21] Appl. No.: 773,613

[22] Filed: Dec. 30, 1996

Related U.S. Application Data

[63] Continuation of Ser. No. 162,645, Dec. 3, 1993, abandoned.

[30] Foreign Application Priority Data

Dec. 16, 1992 [GB] United Kingdom ............... 9226199

[51] Int. Cl.$^6$ ........................................... G06F 11/10
[52] U.S. Cl. ................................ 711/100; 395/250
[58] Field of Search ........................... 395/250, 281, 395/441, 427; 711/114, 111, 100

[56] References Cited

U.S. PATENT DOCUMENTS

| | | | |
|---|---|---|---|
| 4,722,085 | 1/1988 | Flora et al. | 371/38 |
| 4,849,929 | 7/1989 | Timsit | 364/900 |
| 4,942,579 | 7/1990 | Goodlander et al. | 371/51 |
| 5,218,689 | 6/1993 | Hotle | 395/425 |
| 5,257,367 | 10/1993 | Goodlander et al. | 395/600 |
| 5,337,414 | 8/1994 | Hashemi et al. | 395/275 |
| 5,345,565 | 9/1994 | Jibbe et al. | 395/325 |
| 5,402,428 | 3/1995 | Kakuta et al. | 371/10.1 |
| 5,450,548 | 9/1995 | Matsushima | 395/250 |
| 5,487,160 | 1/1996 | Bemis | 395/441 |

FOREIGN PATENT DOCUMENTS

| | | | |
|---|---|---|---|
| 0320107 | 6/1989 | European Pat. Off. | |
| 0478337 | 4/1992 | European Pat. Off. | G06F 3/06 |
| 2156627 | 10/1985 | United Kingdom. | |
| 9201988 | 2/1992 | WIPO | G06F 13/36 |
| 9204674 | 3/1992 | WIPO | G06F 12/08 |

*Primary Examiner*—Krisna Lim
*Assistant Examiner*—Zarni Maung
*Attorney, Agent, or Firm*—Cooper & Dunham LLP

[57] ABSTRACT

A data storage apparatus 20 comprises several disc stores 21 to 24 connected to respective RAM buffers 37 to 40 by respective data interfaces and highways 25 to 36. Sets of data are stored in the disc stores with the data in each set being distributed among the disc stores. The apparatus comprises a controller 51 which, in response to an external request for data, generates control data identifying one or more sets of data to be transferred between the disc stores and the RAM buffers. The control data is transferred to the disc stores 21 to 24 via the respective data interfaces and highways 25 to 36. When data is ready for transfer a signal is sent from the interfaces 33 to 36 and once the controller has received signals from each of the interfaces it enables data to be transferred between the interfaces and respective RAM buffers. A data highway 49 is provided for connection to external apparatus for a substantially continuous sequential transfer of the data in the identified set or all of the identified sets. Data is transferred between the RAM buffers 37 to 40 and the data highway 49 under the control of the controller 51. The highway 49 may be provided with error checking circuitry 55 to 57.

15 Claims, 3 Drawing Sheets

DATA STORAGE APPARATUS INCLUDING PARALLEL CONCURRENT DATA TRANSFER

This is a continuation of application Ser. No. 08/162,645 filed Dec. 3, 1993, now abandoned.

The invention relates to a data storage apparatus. In particular, but not exclusively, the invention relates to a data storage apparatus for storing data representing a series of images which together create a moving picture when displayed on a monitor. Such data storing apparatus may be used advantageously in an electronic editing system.

Electronic editing systems for editing clips of video or film are known. In such systems an initial clip, or clips, of video or film converted into electronic data is stored in a high capacity storage device such as a disc store. As an edited clip is being created, the user of the editing system will read frame data from the store and may modify it in some way before writing it back to the store. The frames in the edited clip may be in a different order to the order of the frames in the initial clip or clips and indeed consecutive frames in the edited clip can come from different initial clips. Thus, data representing the frames in an edited clip may not be stored in frame order and may instead be randomly distributed in the storage device. Huge amounts of data are generated and if the editing system is to be able to play back the clip at normal speed the storage device must be capable both of randomly accessing the stored data on a frame by frame basis and of sustaining a high rate of continuous data transfer.

Disc stores generally are capable of supplying high speed bursts of data for short periods of time, but the accessing of data on the platter in the disc store takes time while the head is moved to the appropriate track on the platter and the platter is rotated so that the appropriate sector thereon containing the data is positioned under the head. Accordingly, there are relatively large periods of time in which data is not being read from the disc store. It will be appreciated that the same problems occur in reverse when data is being written to the disc store. As a result, the average data transfer rate or bandwidth achievable with a store comprising a single platter is no greater than about 2 to 3 $MBs^{-1}$ (million bytes per second). Multiple platter disc stores are also widely available. In such stores the multiple platters provide increased storage capacity, but are usually arranged so that data can only be read from or written to one platter at a time. Most multiple platter disc stores thus have a bandwidth similar to that of a single platter store.

The transfer of data representing an ordinary full colour television picture with blanking requires a bandwidth of 27 $MBs^{-1}$. This bandwidth requirement can be reduced to about 22 $MBs^{-1}$ if end of line blanking and other portions of the video which do not contain any picture information are removed from the video before the video data is stored. Nevertheless, it will be appreciated that a single disc store as discussed hereinabove would be unsatisfactory for storing data representing a video clip if the clip is to be played back at normal speed. In order to overcome this problem so-called parallel transfer disc stores have been developed. For example, Fujitsu in Japan will supply a parallel transfer disc store with an average bandwidth of 15 $MBs^{-1}$ for continuous data. Two of these parallel transfer disc stores in parallel provide a continuous bandwidth of 30 $MBs^{-1}$ which is more than sufficient for transferring video clip data for display at normal video rates, for example 625 or 525 lines per frame and 25 or 30 frames per second.

FIG. 1 of the accompanying drawings shows a schematic representation of a parallel transfer disc store in which a plurality of platters 1 to 6 are mounted to a common spindle 7 driven by a motor 8. Each platter 1 to 6 has an associated pair of read-write heads, for example heads 9 and 10 for platter 1, by which data is read from or written to both sides of each disc. The read-write heads are mounted to a respective arm, e.g. arms 11 and 12, which in turn is mounted to a rotatable shaft 13 driven by a motor 14. In response to signals from addressing control circuitry (not shown) the motor 8 causes the spindle 7 and the platters mounted thereto to rotate at high speed and the motor 14 causes the shaft to rotate through an angle so that all of the heads are positioned over a predetermined track on the respective face of each platter. Each head is connected via a respective read-write circuit 15, 16 to an interface 17. The read-write circuits 15, 16 are provided for conditioning signals after they are read from and before the data are written to the platters via the respective heads 9, 10. In practice the read/write circuits 15, 16 and heads 9, 10 are delicate devices and this makes them difficult and time consuming to set up correctly during manufacture. It will be appreciated that because data is read from and written to the platters 1 to 6 in parallel the overall bandwidth is increased significantly as compared to that of a single platter disc store. Data is still transferred in bursts peaking at about 18 $MBs^{-1}$, because all of the heads are moved simultaneously by the shaft 13. It is nevertheless possible to achieve a data rate or bandwidth of 15 $MBs^{-1}$ as abovementioned.

In our British patent application GB-A-2 156 627 and corresponding U.S. Pat. No. 4,688,106 we describe an editing system having a store comprising several disc stores connected via a bit parallel highway to several framestores. The highway is arranged so that a frame of data can be transferred between the disc stores and frame stores in a time period less than or equal to a display frame period. The several framestores are used in an alternating manner with data representing a first frame being read from one framestore while data representing a second frame is being written to another framestore.

Electronic editing systems are now available for editing film clips in movie production. The picture quality of movies is much higher than that of television and each frame of a film is stored electronically at a much higher resolution than that of a television frame. For example, in our DOMINO (Trade Mark) digital compositor each frame is defined by 2880×2080 picture elements. Clearly, huge amounts of data must be stored for even a short film clip and data transfer rates considerably higher than those needed for ordinary television are required if the film clip is to be viewable at normal speed (24 frames per second). Hitherto, we have solved this problem by connecting several parallel transfer disc stores together in parallel. Eight such stores in parallel provide a data transfer rate of approximately 120 $MBs^{-1}$. In our DOMINO digital compositor clips are displayed at a high resolution corresponding to the European High Definition Television (HDTV) standard of 1440×1024 picture elements, about a quarter of the resolution of that in which data representing the film frames are stored. Our DOMINO compositor requires a bandwidth of approximately 108 $MBs^{-1}$, and eight parallel transfer disc stores in parallel therefore provide sufficient bandwidth for displaying of a clip at HDTV resolution.

Parallel transfer disc stores are not widely used because in most computer applications the processing circuitry is not capable of handling data at a rate of, for example, 15 $MBs^{-1}$ from a store and is generally only capable of processing around 2 to 3 $MBs^{-1}$ for sustained periods of time. The market for parallel transfer discs is therefore limited to a few specialist areas including supercomputers and, of course, electronic picture editing and processing. As a result parallel transfer disc stores are expensive.

An alternative to a parallel transfer disc stores is described in an article by Patterson, Gibson and Katz entitled "A Case of Redundant Arrays of Inexpensive Discs (RAID)", published in SIGMOD International Conference on Management of Data, 1988 Proceedings, SIGMOD Record Volume 17, Number 3.

Patterson et al suggest the use of arrays of small disc stores with built-in redundancy (error checking) corresponding to one of five RAID levels. Level one and two RAIDs are concerned with improving the reliability of data retrieval without any significant increase in data transfer rates as compared to that of a single small disc store. A level one RAID uses a second disc store to mirror the contents of the first and a level two RAID uses several small disc stores to store data together with an interleaved Hamming code. Data transfer rates are improved significantly in level three, four and five RAIDs. In a level three RAID a single redundant check disc or parity disc is used and data is written to or read from other discs in the array simultaneously. Spindle synchronisation between small disc stores in the array can be used to reduce delays caused by the rotation of the discs and movement of the heads. Level four and five RAIDs provide variations on the level three RAID as regards the manner in which data, including parity data, is transferred to and from the small disc stores of the array.

While RAIDs can be built which offer improved data transfer rates as compared to that of a single small disc store the improvement is limited by the manner in which data is transferred to and from disc stores. As already mentioned hereinabove, data is transferred in bursts to and from the disc stores and therefore RAIDs suffer from similar problems to those suffered by parallel transfer disc stores. We are unaware of any RAIDs that have been designed to have a data transfer rate greater than about 10 $MBs^{-1}$.

The invention aims to provide a data storage apparatus which is able to maintain a sustained, continuous high data transfer rate.

The invention also aims to provide a data storage apparatus comprising a plurality of disc stores, in which the effect of delays caused for example by the movement of a read/write head to a desired track on a platter and the rotation of the platter to the desired sector in the track, is significantly reduced thereby enabling the data to be output continuously at a high rate from the apparatus.

Also, the invention aims to provide a data storage apparatus in which error checking data is created when the data is written for storage in the apparatus and the error checking data is used to correct errors in data read from the apparatus.

According to one aspect of the invention there is provided a data storage apparatus comprising: a plurality of disc stores for storing one or more sets of data, the data in the or each set being distributed among the disc stores; a plurality of respective buffer storing means; a plurality of respective data transferring means to interface each disc store and the respective buffer storing means for transferring data therebetween, the transferring means comprising means for providing an indication when said data is available for transfer between said disc stores and respective buffer storing means; controlling means for generating control data identifying at least one set of data to be transferred between the transferring means and the buffer storing means, which control data is output to said transferring means for transfer to the disc stores for control thereof, the controlling means being responsive to said indication from said transferring means for controlling said transferring means and said buffer storing means to transfer data in the identified set between said transferring means and said storing means; and interfacing means coupled to a data highway which is connectable to external apparatus for a substantially continuous sequential transfer of the data in the identified set or all of the identified sets, the interfacing means being controlled by said controlling means to effect the transfer of data between said buffer storing means and said data highway in a selected sequence.

According to another aspect of the invention there is provided a data storing system in which data representing one or more image frames is distributed among a plurality of disc stores, each disc store being interfaced to a respective transfer highway which, in turn, is interfaced to a respective random access buffer such that the data can be transferred asynchronously between the disc stores and respective buffers, the transfer of data between one disc store and the respective buffer being asynchronous with the transfer of data between other disc stores and respective buffers and being controlled by a controller which identifies the data required to be transferred in advance of the requirement for the data and sends identification data to said disc stores via said transfer highway, each of the random access buffers being interfaced to a sequential data highway and being controlled by the controller such that data can be transferred substantially continuously when required in a controlled sequence between the buffers and the highway.

According to another aspect of the invention there is provided a memory system in which data is distributed among a plurality of storing devices, each storing device having an associated temporary store and being arranged so that data can be transferred between each storing device and associated store substantially simultaneously with and independently of transfers of data between the other storing devices and their associated stores, the temporary stores being connected to a common data bus for a transfer of data in a predetermined order between the system and an external device to which the system is connectable, the memory system including a data generator for generating error checking data as data is input to the system for storage among the storing devices and a data regenerator for regenerating valid data in the event that erroneous data is identified during the reading of data from the storage devices.

The above and further features of the invention are set forth with particularity in the appended claims and together with advantages thereof will become clearer from consideration of the following detailed description of an exemplary embodiment of the invention given with reference to the accompanying drawings.

IN THE DRAWINGS

Figure 1:
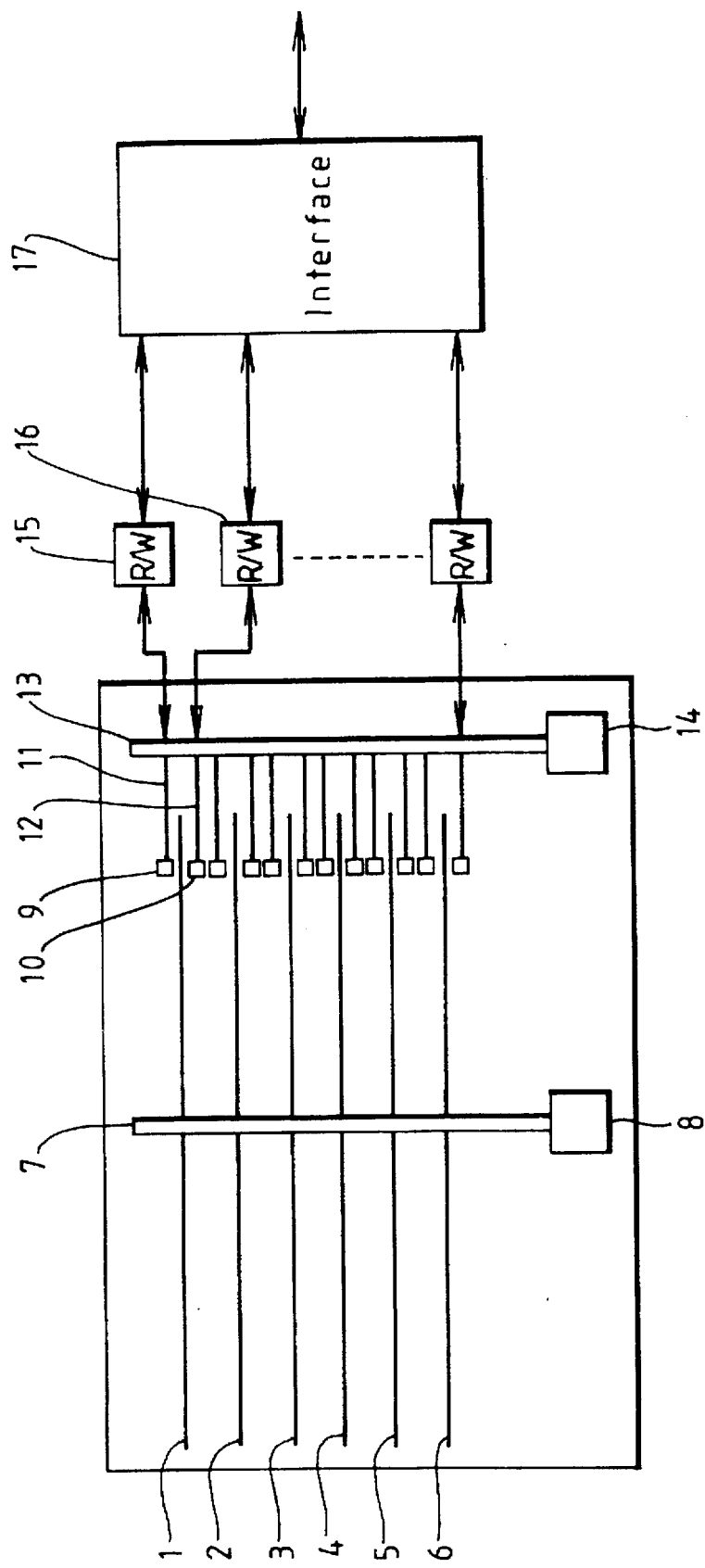
FIG. 1 is a schematic representation of a parallel transfer disc store, as previously discussed herein.
Figure 2:
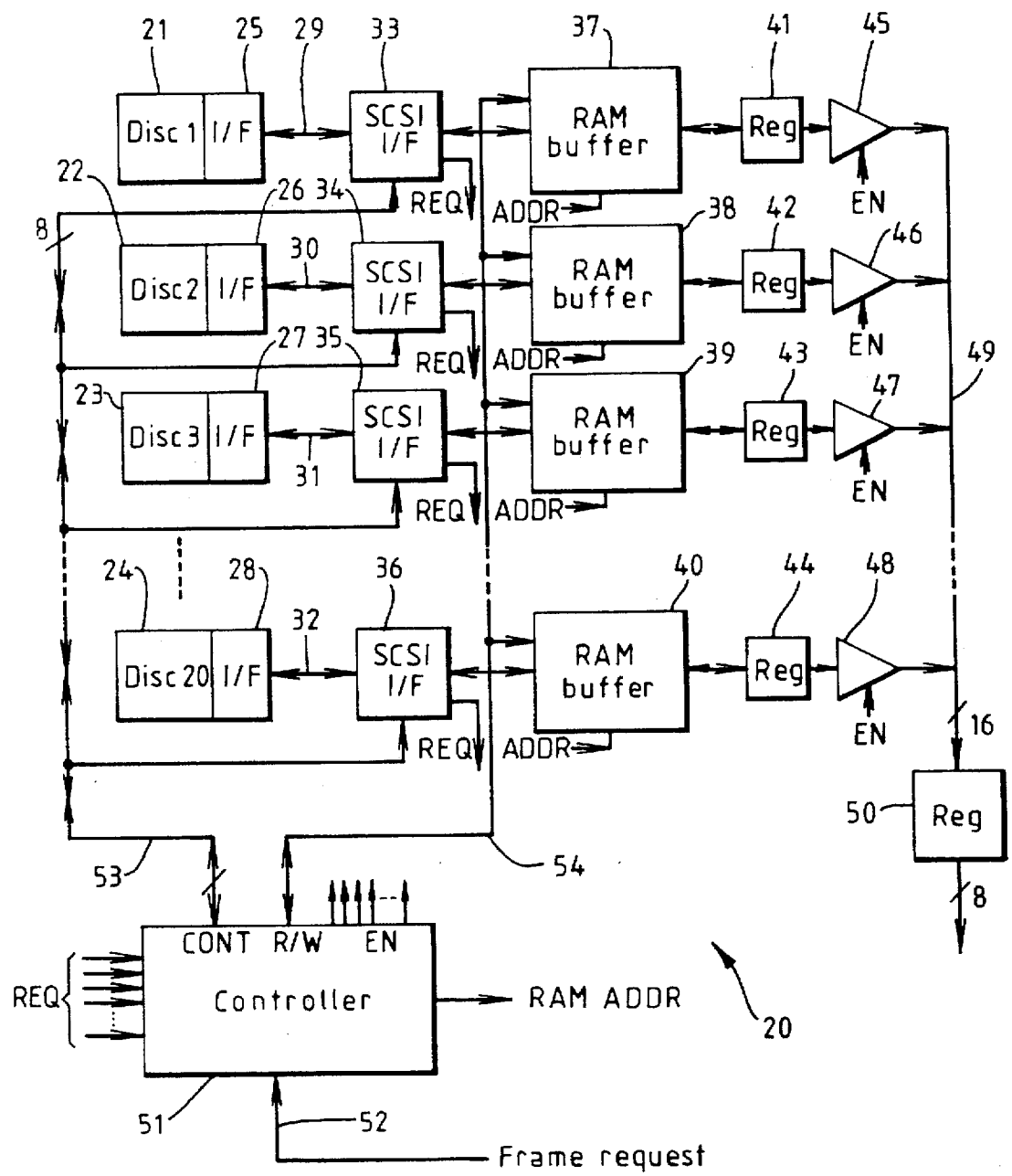
FIG. 2 is a functional block diagram of a system embodying the invention.

Turning now to FIG. 2 of the accompanying drawings there is shown a data storage system, indicated generally at 20, comprising a plurality of disc stores 21 to 24 each having an associated Small Computer System Interface (SCSI) interface 25 to 28. Each of the disc stores 21 to 24 is a relatively small (physically) single disc storage device, e.g. a 3½ inch disc drive and contains several platters and read/write circuitry (not shown) for reading from or writing to one platter at a time. Such disc storage devices presently available are capable of storing up to 520 or even 1200 MBytes (MB) of data depending on the type of device used and it is expected that within the next year or so equivalent devices will be available with a capacity of approximately 2500 MB. Any of the aforementioned disc stores are well suited to use in the system 20. Suitable disc storage devices with built-in SCSI interfaces are available from several different manufacturers. Each of the SCSI interfaces 25 to 28 is connected via a respective SCSI highway 29 to 32 to a respective second SCSI interface 33 to 36 each associated with a RAM buffer 37 to 40. Each of the RAM buffers 37 to 40 is a solid state device and has sufficient storage locations for up to about 2 MB of data.

The system 20 as shown comprises twenty disc stores each connected via an associated SCSI highway to a respective one of twenty RAM buffers. Using the presently available 520 MB capacity disc store devices, this provides a storage capacity in the disc stores of approximately 10 GB which corresponds to approximately 15 minutes of video at normal television rates.

When a video clip is to be displayed in real time, data representing twenty five frames must be output every second from the disc storage apparatus. This requires the disc storage apparatus to have a minimum continuous output bandwidth of at least 22 $MBs^{-1}$ and preferably about 27 $MBs^{-1}$. The RAM buffers 37 to 40 provide storage for 40 MB of data representing nearly two seconds of video at normal 625 or 525 line rates (i.e. at least 22 $MBs^{-1}$). Each of the RAM buffers 37 to 40 outputs data to a respective register 41 to 44 which in turn outputs data via an associated tri-state buffer 45 to 48 to a single data highway 49. Data on the highway 49 is in the form of 16-bit words and is reduced to 8-bit bytes of data by a register 50 before being output from the apparatus for display or processing by an editing or a processing system (not shown) to which the storage system 20 is connected.

The system 20 is controlled by a system controller 51 which receives frame request data from an external processing apparatus (not shown) via request bus 52 and in response thereto outputs control data along control bus 53 to the second SCSI interfaces 33 to 36 identifying the next frame of data to be output from the disc stores 21 to 24. The controller 51 also receives request signals REQ from each of the second SCSI interfaces 33 to 36 associated with the RAM buffers 37 to 40 and respective enable signals EN to each of the tri-state buffers 45 to 48, thereby controlling the outputting of data to the highway 49.

The system 20 is intended for use as a data store from which data is read for processing by external equipment and to which data is written once processed by external equipment. For the purpose of further explanation it will be assumed that the apparatus is configured for the continuous reading of data from the disc stores. However, it should be borne in mind that the apparatus can also be configured to enable data to be written to the disc stores, the writing operation being substantially the reverse of the reading operation with incoming data from the highway 49 being written to the RAM buffers 37 to 40 and subsequently being transferred therefrom to the disc stores 21 to 24 via the SCSI buses and interfaces 25 to 36.

In response to a request from external equipment (such as a processing or editing system) on bus 52 for a frame of image data, the controller outputs frame data identifying the required frame to the twenty second SCSI interfaces via control bus 53. The frame data is transmitted by the second SCSI interfaces 33 to 36 over the SCSI highways 29 to 32 to the first SCSI interfaces 25 to 28 where it is converted into read instructions which identify the location in the disc stores of data relating to the requested frame. The disc stores respond to the instructions by reading the requested data for output over the SCSI highways. The use of disc stores having dedicated or built-in SCSI interfaces simplifies considerably the control data required to control the identification and accessing of image data on the discs. As is well known, the SCSI interface comprises a processor which interprets incoming control data and converts the same into commands which are used to drive the discs and to access desired data at the correct locations thereon.

The data for each image frame is distributed evenly and in a predetermined manner among the twenty disc stores. For example, the data for the first pixel in a frame may be stored in disc store 21, the data for the second pixel in disc store 22, the data for the third in store 23 and so on. In order to simplify operation of the system each disc store and associated first SCSI interface is arranged so that data for each frame distributed among the disc stores is stored at the same location in each of the stores. Thus, for example data for the first picture element in a frame could be stored in the first track, first sector of the second platter of disc store 21 and data for the second picture element stored in the first track, first sector of the second platter of disc store 22. Requested data is read from each disc store 21 to 24 and transferred by the first SCSI interfaces 25 to 28 along the associated SCSI highway 29 to 32 to the respective second SCSI interfaces 33 to 36 associated with the RAM buffers 37 to 40. Data is transferred along the SCSI highway a byte (8 bits) at a time. Each second SCSI interface 33 to 36 waits until it has received a word (two bytes) of data and then outputs a request signal REQ to the controller 51.

Each of the disc stores 21 to 24 includes an internal buffer (not shown) which goes some way to controlling the outputting of data from the store. Nevertheless, data is transferred in uneven and unsynchronised bursts from the disc stores 21 to 24 depending on the time taken for the read heads in the store to move to the correct position over the platters therein. Considering for the moment only one disc store, say store 21, once the correct position is reached by the read head the data is read from the correct platter as a burst of information at an average rate of up to 3 $MBs^{-1}$. The burst of data is transferred at this rate a byte at a time over the SCSI highway 29 to the second SCSI interface 33 which assembles it into data words. In order to avoid a bottleneck of data the SCSI highway 29 should be able to deliver data at a rate at least equal to the maximum rate of a burst of information from the disc store 21. In fact a SCSI highway has a bandwidth of around 5 $MBs^{-1}$ and is therefore well able to handle bursts of data at 3 $MBs^{-1}$. During periods when bursts of video data are not being transmitted over the SCSI highways other data can be transmitted on the highways and it is during these periods that control data including the frame data generated by the controller 51 is transferred from the second SCSI interfaces 33 to 36 to the respective first SCSI interfaces 25 to 28.

It will be appreciated by those possessed of the appropriate skills that because data transfer between the disc stores 21 to 24 and their respective second SCSI interfaces 33 to 36 is uneven and unsynchronised, the second SCSI interfaces 33 to 36 will receive their two bytes of data at different times. The controller 51 is arranged to utilise the buffering provided by the SCSI interface and to wait until all twenty of the second interfaces have output a request signal before outputting a write strobe signal over line 54 to the RAM buffers 37 to 40. The write strobe signal causes the RAM buffers 37 to 40 to receive a word of data from their respective second SCSI interfaces 33 to 36. At the same time, the controller 51 outputs RAM address data to the RAM buffers 37 to 40 so that the data from the second SCSI interfaces 33 to 36 is stored at the same respective locations in the RAM buffers 37 to 40. This process is repeated until all of the data relating to the requested frame has been copied from the disc stores 21 to 24 to the RAM buffers 37 to 40. Instead of sending each request signal REQ to the controller 51 and waiting until all requests have been received before strobing the write line 54, this function of the controller 51 could, if desired, be realised by individual sub-controllers (not shown) between each of the second SCSI interfaces 33 to 36 and their respective RAM buffers 37 to 40. Each sub-controller would monitor the request signal REQ from its second SCSI interface and in response to a request would strobe the write line of its RAM buffer causing a word to be transferred from the second SCSI interface to the RAM buffer. However, the single controller 51 arrangement is preferred because it considerably simplifies the control and addressing of the RAM buffers 37 to 40 because all twenty RAM buffers are controlled and addressed simultaneously over common lines.

The SCSI interfaces and highways thus provide a means by which the twenty disc stores can output data asynchronously and the provision of such a large number of disc stores and associated interfaces and highways enables an extremely high data transfer rate (potentially 100 MBs$^{-1}$ albeit in unsynchronised bursts) to be achieved between the disc stores and the RAM buffers.

Once all of the data for the requested frame has been transferred to the RAM buffers 37 to 40 it can be output therefrom to the highway 49. Data is output from the RAM buffers 37 to 40 by applying a read strobe signal to the line 54 while simultaneously addressing the same location in each of the stores. This causes one stored word of data to be output from each of the RAM buffers 37 to 40 to the respective register 41 to 44. The registers 41 to 44 each hold a single word of data and the word is output therefrom as each of the tri-state buffers 45 to 48 is enabled in sequence. Each tri-state buffer 45 to 48 is enabled individually for output of the data word from the respective register to the highway 49. This occurs for each of the registers and is repeated until all of the data relating to the requested frame has been output to the highway 49. Data is transferred from the RAM buffers 37 to 40 in rapid succession to the highway 49 to the extent that data is transferred over the highway at a substantially continuous rate of about 40 MBs$^{-1}$. Clearly, this is well in excess of the 27 MBs$^{-1}$ bandwidth required for normal television rates and well in excess of the 30 MBs$^{-1}$ available using two parallel transfer disc stores. As with the parallel transfer disc stores, higher rates can be achieved simply by placing two or more systems in parallel.

Alternatively, a greater number of disc stores, SCSI interfaces and highways and RAM buffers may be used in the system 20 to achieve higher data transfer rates. The reading of the data from the discs is asynchronous and there are therefore no difficulties in expanding the system to accommodate a larger number of disc drives and associated circuitry.

While data relating to one frame is being output from the RAM buffers 37 to 40 a request for data representing another frame can be input to the controller 51 via bus 52 and in response thereto the controller 51 outputs new frame data to the SCSI interfaces 25 to 28 of the disc stores 21 to 24. In this way, the disc stores 21 to 24 are primed ready to start outputting new data as soon as the RAM buffers 37 to 40 are ready for it. The speed of the system can be further increased by using two port RAM devices with one port being used for the writing of data from the respective second SCSI interface 33 to 36 while the other port is used for the reading of data for the respective registers 41 to 44. The reading of data from one port and the writing of data to the other port of a RAM buffer occurs independently and so long as there is space available in the RAM buffers to accommodate new data the reading and writing of data can take place at the same time.

The high data rates (up to 100 Mbs$^{-1}$) at which data is transferred over the twenty parallel SCSI highways between the disc stores and the RAM buffers enables the system 20 to be treated as a frame random access store. That is to say, any frame of data stored in the disc stores 21 to 24 can be accessed as quickly as any other frame of data. The high data rate on the parallel SCSI highways is well in excess of the 40 MBs$^{-1}$ rate at which data is output from the system on the highway 49 and thus any delays caused by the positioning of heads in the disc stores will not affect the data rate on the highway 49. As a random access frame store the system 20 is well suited for use in an editing system.

In systems where there is a high rate of continuous data transfer, problems can arise when data errors occur because often it is not possible to go back and check the incorrect data either at all or without first stopping the data transfer. Clearly this is unacceptable where the data is being output for the display of video pictures. Forward error correction techniques, such as the Hamming coding method, are known in which extra bits are added to the data so that an error can be detected and corrected. However, the Hamming coding method introduces a high level of redundancy into the data, for example four error-checking bits are required in a sixteen ($2^4$) bit word.

Disc stores are nowadays provided with internal circuitry which use cyclic redundancy checking (CRC) techniques to check for errors in data as it is read from the platter. This internal error checking is usually very good and can be relied upon to provide an indication of an error during the reading out of data from the store. The system 20 can be modified to take advantage of this built-in error checking in each of the disc stores and to use error correction techniques to correct a thus detected error before the data is output from the system. Thus, the system 20 shown in FIG. 2 can be modified to make use of error correction based on an exclusive-or operation applied to groups of data words as the words are written to and read from the disc stores. An exclusive-or operation can only detect one incorrect bit of data but it is highly unlikely that more than one disc at a time will provide erroneous data. Furthermore, SCSI interfaces are so reliable that it is also highly unlikely that any errors will be introduced into the data from elsewhere in the system. A single bit error correcting technique is therefore satisfactory under most circumstances. The modification to the system 20 is shown in FIG. 3 of the accompanying drawings.

Figure 3:
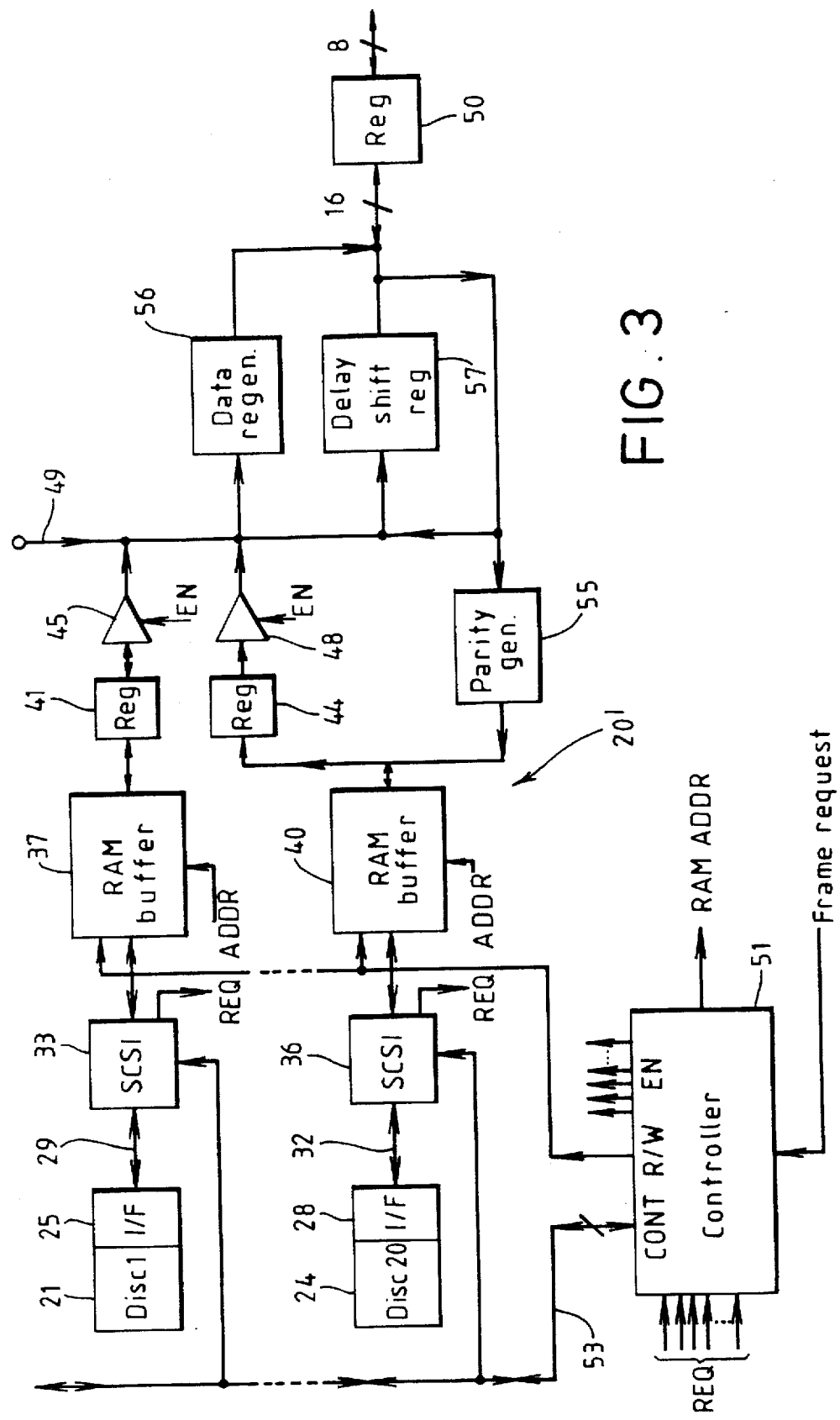
FIG. 3 is a function block diagram showing an error-correcting version of the system of FIG. 2.

Referring to FIG. 3 there is shown part of a system 20' which is in many respects similar to the system 20 in FIG. 2 of the drawings. In FIG. 3 those parts of the system 20 that are the same as parts in the system 20 are identified by the same designation. The system 20 comprises twenty disc stores of which two are shown. As in FIG. 2, each disc store 21, 24 has respectively a SCSI interface 25, 28 a SCSI highway 29, 32 and a second SCSI interface 33, 36 that interfaces to a respective RAM buffer 37, 40. Data from each RAM buffer 37, 40 is output via a respective register 41, 44 and tri-state buffer 45, 48 to the data highway 49.

In the system 20' one of the disc stores, e.g. the last disc store 24, is not used to store image data but instead is used to store parity data which is generated by a parity generator 55 from sets of image data as the image data is input for storage in the disc stores. Incoming 16-bit words of data from the register 50 are input to the parity generator 55 where they are sequentially processed in an exclusive-or operation to produce a 16-bit parity word. The received data words are then output for storage in a respective one of the first nineteen disc stores and the newly generated parity word is stored in the twentieth disc store 24. As is well known, applying an exclusive-or operation to multiple bits generates a single bit of data corresponding to an even parity (logic 0 for an even number of logic 1 inputs and logic 1 for an odd number of logic 1 inputs). This operation is repeated for each set of nineteen incoming words until all of the incoming data has been stored in the disc stores. Thus, nineteen of the disc stores are used to store incoming image data and the remaining, twentieth, disc store is used to store generated parity data. The error checking or parity data thus reduces the storage capacity of the system by one in twenty or 5%.

When an error is detected by the discs' own error checking facilities during the reading out of data therefrom a signal is sent via the control bus 53 to the controller 51 indicating which disc, and hence which data, contains the error. The controller 51 responds to this information by modifying the order in which the registers 41 to 44 are read, or more strictly speaking the tri-state buffers 45 to 48 are enabled, so that the erroneous data word is replaced by the corresponding parity word. Thus, if data from the third disc is found to be bad, the data is read as normal from the first and second registers. The third register is then ignored and instead the in-state buffer for the twentieth register is enabled and the parity data read therefrom. The enabling of the tri-state buffers next returns to the buffer for the fourth register and then the fifth and so on up to and including the nineteenth register.

The data thus output from the registers 41 to 44 is input via highway 49 to a data regenerator unit 56 and a delay shift register 57. The data regenerator 56 performs a bit-wise exclusive-or operation, similar to that performed by the parity generator 55, on the data that it receives from highway 49. The effect of performing an exclusive-or operation on eighteen words of good data together with the associated parity word is to generate an output word which is the same as the missing word of data. The data words are output from the delay shift register 57 in order until the parity word is reached. The parity word is discarded and the missing data word regenerated by the data regenerator 56 is output in its correct place in the data sequence. It should be noted that the delay shift register 57 is included to delay the outputting of data from the system while the data regenerator 56 calculates the missing data. The delay shift register 57 introduces a delay into the highway 49 corresponding to the transmission of nineteen words of data on the highway. When there are no detected errors data is simply output unaltered via the delay shift register 57 to the register 50.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

I claim:

1. A data storage apparatus comprising:
   a plurality of disc stores for storing one or more sets of data, the data in the or each set being distributed among the disc stores;
   a plurality of respective buffer storing means; a plurality of data transferring means, each data transferring means being connected to provide a direct interface between a respective one of the plural disc stores and a respective one of the plural buffer storing means for concurrent transfer of data between the plural disc stores and the plural buffer storing means, the data transferring means being operable independently of each other for asynchronous transfer of data between the plural disc stores and the plural buffer storing means and each data transferring means comprising respective means for providing an indication when said data is available for transfer between the disc store and the buffer storing means connected thereto;
   controlling means for generating control data identifying at least one set of data to be transferred between the plural disc stores and plural buffer storing means, which control data is output to each of said transferring means for transfer to the respective disc stores for control thereof, the controlling means being responsive to said indication from each of said transferring means to control said plural transferring means and said plural buffer storing means for the transfer of data in the identified set between said plural disc stores and said plural buffer storing means; and
   interfacing means coupled between said plural buffer storing means and a data highway which is connectable to external apparatus for a substantially continuous sequential transfer of the data in the identified set or all of the identified sets directly between the plural buffer storing means and the data highway, the interfacing means being controlled by said controlling means to effect the transfer of data between each of said buffer storing means and said data highway in a selected sequence.

2. A data storage apparatus as claimed in claim 1, wherein each of the buffer storing means comprises a random access storage device having a multiplicity of storage locations, and wherein accessing of storage locations within the storing means is controlled by the controlling means.

3. A data storage apparatus as claimed in claim 1, wherein each of the data transferring means comprises a first interface connected to the respective disc store, a second interface connected to the respective buffer storing means, and a data highway connecting the first and second interfaces to each other.

4. A data storage apparatus as claimed in claim 3, further comprising a control bus between the controlling means and the second interfaces for transferring control data for the disc stores between the controlling means and the controlling means.

5. A data storage apparatus as claimed in claim 3, wherein each second interface is arranged to output a signal to the controlling means as said indication of data available for transfer.

6. A data storage apparatus as claimed in claim 4, wherein said controlling means is arranged to respond to an external request for data by outputting data identifying the requested data via said control bus to said controlling means for the disc stores.

7. A data storage apparatus as claimed in claim 1, wherein said interfacing means comprises a plurality of tri-state buffers connected between the data highway and respective said buffer storing means, said tri-state buffers capable of being sequentially enabled by said controlling means.

8. A data storage apparatus as claimed in claim 7, wherein said interfacing means further comprises a plurality of registers respectively connected between said buffer storing means and said tri-state buffers.

9. A data storage apparatus as claimed in claim 1, further comprising error checking and correcting means for checking and correcting errors in data stored in said plurality of disc stores.

10. A data storage apparatus as claimed in claim 9, wherein said error checking and correcting means comprises parity generating means for generating parity data from groups of data as data is received by said apparatus for storage in said plurality of disc stores.

11. A data storage apparatus as claimed in claim 10, wherein said controller is arranged to control the storing of data such that said generated parity data is stored in one of said disc stores and the incoming data is distributed for storage in the remainder of the stores in said plurality of disc stores.

12. A data storage apparatus as claimed in claim 10, wherein said parity generating means comprises means for effecting an exclusive-or operation on all of the data in each of said groups.

13. A data storage apparatus as claimed in claim 9, wherein said error checking and correcting means comprises identifying means associated with said disc stores, or said data transferring means, or said disc stores and said data transferring means for identifying the existence of erroneous data in data groups read from said disc stores.

14. A data storage apparatus as claimed in claim 13, wherein said error checking and correcting means comprises data regenerating means for generating valid data to replace erroneous data identified by said identifying means.

15. A data storage apparatus as claimed in claim 10, wherein said error checking and correcting means comprises data regenerating means for generating valid data to replace erroneous data identified by said identifying means and said regenerating means comprises means for effecting an exclusive-or operation on valid data in a data group and the parity data associated with said data group.

* * * * *